United States Patent [19]

Kuchelmeister et al.

[11] Patent Number: 5,242,101
[45] Date of Patent: Sep. 7, 1993

[54] METHOD FOR BRAZING CATALYTIC CONVERTER CARRIER BODIES

[75] Inventors: Reinhold Kuchelmeister, Waldenbuch; Bohumil Humpolik, Ludwigsburg; Jürgen Bayer, Esslingen; Klaus Haller, Stuttgart, all of Fed. Rep. of Germany

[73] Assignee: Emitec Gesellschaft fuer Emissionstechnologie, Lohmar, Fed. Rep. of Germany

[21] Appl. No.: 989,174

[22] Filed: Dec. 11, 1992

[30] Foreign Application Priority Data

Dec. 21, 1991 [DE] Fed. Rep. of Germany ....... 4142533

[51] Int. Cl.⁵ .................. B23K 31/02; B23K 101/02
[52] U.S. Cl. ................ 228/181; 228/248.1; 228/253; 29/890; 427/181
[58] Field of Search ............. 228/181, 208, 248, 253, 228/224; 29/890; 427/181

[56] References Cited

U.S. PATENT DOCUMENTS

| | | | |
|---|---|---|---|
| 3,291,631 | 12/1966 | Smith | 427/181 |
| 3,479,731 | 11/1969 | Mantel et al. | 228/248 |
| 3,722,071 | 3/1973 | Van Orsdel | 228/181 |
| 4,923,109 | 5/1990 | Cyron | |

FOREIGN PATENT DOCUMENTS

| | | |
|---|---|---|
| 0136514 | 4/1985 | European Pat. Off. |
| 2303746 | 7/1974 | Fed. Rep. of Germany |
| 2313040 | 4/1979 | Fed. Rep. of Germany |
| 2947694 | 9/1981 | Fed. Rep. of Germany |
| 3037796 | 5/1982 | Fed. Rep. of Germany |
| 2924592 | 5/1983 | Fed. Rep. of Germany |
| 8702284 | 8/1987 | Fed. Rep. of Germany |
| 3608120 | 9/1987 | Fed. Rep. of Germany |
| 3726502 | 3/1988 | Fed. Rep. of Germany |
| 8631017 | 8/1988 | Fed. Rep. of Germany |
| 3712279 | 10/1988 | Fed. Rep. of Germany |
| 3726072 | 2/1989 | Fed. Rep. of Germany |
| 3843350 | 7/1989 | Fed. Rep. of Germany |
| 3603882 | 2/1990 | Fed. Rep. of Germany |
| 4017886 | 5/1991 | Fed. Rep. of Germany |
| 271860 | 9/1989 | German Democratic Rep. |
| 2236500 | 4/1991 | United Kingdom |

*Primary Examiner*—Samuel M. Heinrich
*Assistant Examiner*—Jeffrey T. Knapp
*Attorney, Agent, or Firm*—Herbert L. Lerner; Laurence A. Greenberg

[57] ABSTRACT

Catalytic converter carrier bodies have a jacket and adjacent layers of corrugated or smooth and corrugated metal foils wound or layered in the jacket. The metal foils contact each other and contact the jacket at connecting points, defining flow channels between the metal foils and between the metal foils and the jacket and defining brazing gaps at the connecting points. A method for brazing the carrier bodies includes initially dispersing powdered brazing material with a suitable particle size in a mixture of binder material and liquid. The flow channels are flooded with the liquid mixture for depositing the brazing material in at least some of the brazing gaps. Excess mixture is subsequently removed from the flow channels and the carrier body is then brazed.

18 Claims, 1 Drawing Sheet

U.S. Patent    Sep. 7, 1993    5,242,101
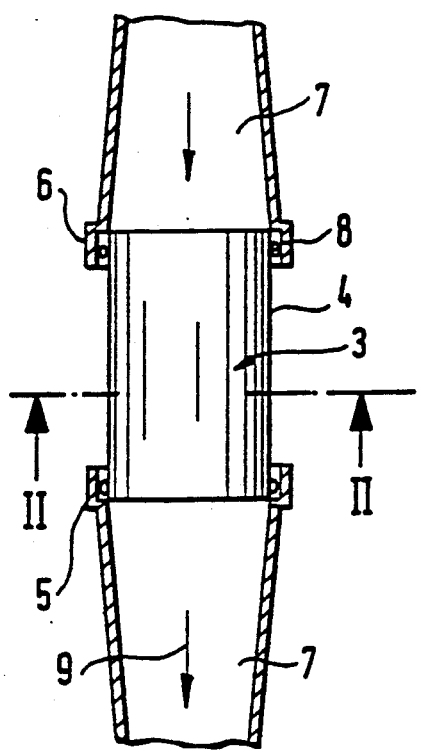
Fig. 1
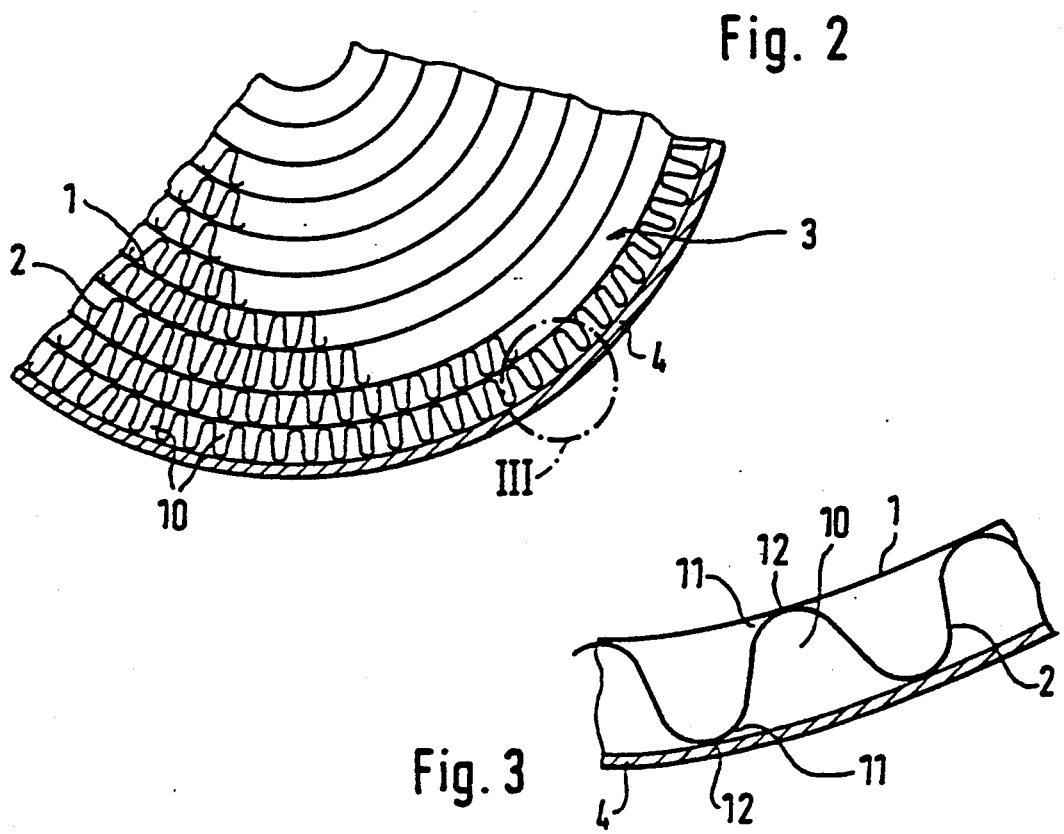
Fig. 2
Fig. 3

METHOD FOR BRAZING CATALYTIC CONVERTER CARRIER BODIES

The invention relates to a method for brazing catalytic converter carrier bodies having flow channels formed between adjoining or adjacent layers of corrugated or smooth and corrugated metal foils being wound or layered to form the carrier body, which includes depositing powdered brazing material with a suitable particle size in brazing gaps at connecting points between the metal foils and/or between the metal foils and the jacket.

Such a method is known from Published European Application No. 0 136 514 A1. That method provides for a powdered brazing material with a particle size distribution adapted to the brazing gaps, wherein the entire structure of the carrier body is filled with the powdered brazing material as completely as possible at the intended connecting points. The excess powdered brazing material is then removed, so that powdered brazing material is located only in the gaps in the immediately vicinity of the previously connecting brazing points. Since no binder is used when the powdered brazing material is applied in that way, there is no assurance that the powdered brazing material will have uniformly reached all of the later connecting points, or such assurance can only be made by means of additional method steps, such as compaction or shaking.

Other methods, in which an adhesive substance is applied to surfaces to be brazed and is then dusted with powdered brazing material (such as in Published European Application No. 0 049 489 A1), cannot be used with carrier bodies of the type dealt with herein, which have already been wound or layered, because the fine honeycomb-like structures of the carrier bodies, that are produced from very thin metal sheets, do not allow application in that way.

It is accordingly an object of the invention to provide a method for brazing catalytic converter carrier bodies, which overcomes the hereinafore-mentioned disadvantages of the heretofore-known methods of this general type and which does so in such a way that binders and brazing material can be delivered to the connecting points without requiring a complicated and expensive application of binder and brazing material, for instance even before the winding or layering is performed.

With the foregoing and other objects in view there is provided, in accordance with the invention, a method for brazing catalytic converter carrier bodies having a jacket and adjacent or adjoining layers of corrugated or smooth and corrugated metal foils wound or layered in the jacket, the metal foils contacting each other and contacting the jacket at connecting points, defining flow channels between the metal foils and between the metal foils and the jacket and defining brazing gaps at the connecting points, which comprises initially dispersing powdered brazing material with a suitable particle size in a mixture of binder material and liquid; flooding the flow channels with the liquid mixture for depositing the brazing material in at least some of the brazing gaps; subsequently removing excess mixture from the flow channels; and then brazing in the brazing gaps.

This method is based on the recognition that with this kind of flow, only very low velocities can be established in the wedge-shaped cross-sectional regions of the flow channels of the carrier body, so that the powdered brazing material, including the binder entrained by the flowing medium, will be deposited in these regions. After the flooding, the flow channels are freed of the excess mixture, and all that remains in the meniscuses or crescent-shaped spaces between the corrugated sheet-metal strips and the smooth sheet-metal strips, or between the meniscuses or crescent-shaped spaces of the corrugated sheet-metal strips and the jacket, is gaps filled with a mixture of brazing material and binder, which assure a perfect connection after the brazing. Otherwise, the result could be an undesired breakdown and thus a reduction in strength of the sheet-metal material. Such surfacecovering moistening is avoided by the invention. The quantity of brazing material being applied matches the optimal dosage at the connecting points, over the entire length of the flow channels of the carrier body.

In accordance with another mode of the invention, there is provided a method which comprises inserting the metal foils and the jacket into a flow line carrying the mixture for performing the flooding step.

In accordance with a further mode of the invention, there is provided a method which comprises drying the metal foils and the jacket after the excess mixture is removed from the flow channels.

The flooding can be attained in a simple manner by inserting the carrier body into a flow line. If the excess mixture has not already flowed out of the flow channels again due to its own fluidic property, then it can be removed from these flow channels by an additional blow-off or flushing-out operation. Optionally, in particular when the mixture is flushed out, drying of the carrier body becomes necessary.

In accordance with an added mode of the invention, there is provided a method which comprises making the flow profile of the mixture uniform in the region facing into the flow. This provides assurance for a uniform deposition of brazing material.

However, in accordance with a concomitant mode of the invention, there is provided a method which comprises excluding given regions of the metal foils from flooding.

For example, it is also possible to cover individual regions of the end surface of the carrier body with a mask, so that brazing material is deposited, and brazing occurs later, only in selected regions. As a result, thermal expansions in the carrier body can be better controlled.

Other features which are considered as characteristic for the invention are set forth in the appended claims.

Although the invention is illustrated and described herein as embodied in a method for brazing catalytic converter carrier bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, longitudinal-sectional view of a flow line into which a carrier body has been inserted in order to be flooded with a mixture of binder and powdered brazing material;

FIG. 2 is an enlarged, fragmentary, cross-sectional view taken along the line II—II of FIG. 1, in the direction of the arrows; and FIG. 3 is a fragmentary, further enlarged view of a portion III in FIG. 2.

Referring now to the figures of the drawing in detail and first, particularly, to FIGS. 1 and 2 thereof, it is seen that in order to be able to carry out the method of the invention, a carrier body 3, which is already completely wound from smooth strips 1 and corrugated strips 2 shown in FIG. 2, and which is press-fitted into a jacket 4, is first inserted between two ends 5 and 6 of a flow line 7. The jacket 4 is received, for instance by the sleeve-like connection ends 5 and 6, with or without a sealing ring 8. A flow of a liquid mixture of powdered brazing material, binder material and liquid through the flow line 7 takes place is in the direction of arrows 9, in other words from top to bottom, in the direction of the force of gravity.

This mixture may, for instance, be formed of 2 to 8 g and preferably 5 g of binder material, such as wallpaper paste, and 200 to 1500 g and preferably 500 g of powdered brazing material with a particle size of up to a maximum of 120 per liter of liquid, which is preferably water.

It can be seen from FIG. 2 that the flow channels 10 formed between the various smooth strips or foils 1 and corrugated strips or foils 2 experience the flow of this mixture through them.

FIG. 3 shows that these flow channels 10 form wedge-shaped gaps 11 at various peripheral regions where the corrugated strip 2 abuts against either adjacent smooth strips 1 or the jacket 4. Specifically, the gaps 11 are in front of each point 12 of contact of the corrugated strip 2 with a smooth strip 1 or with the jacket 4, which will later become connecting points. In these gaps 11, which are also referred to as meniscuses or crescent-shaped spaces, only a very low flow velocity occurs in the flow of the liquid mixture through them, in comparison with the free or open cross-sectional region of the flow channels 10. As a result, in these gaps 11, the powdered brazing material, including a proportion of binder material entrained by the liquid mixture, is deposited in concentrated fashion. Once the flooding process has ended, then brazing material particles having a size that was naturally matched to the gaps 11 beforehand will have deposited in these gaps In order to remove brazing material in regions of the flow channels 10 not belonging to the gaps 11, it may be sufficient to merely allow the mixture a certain period of time to flow and drip out of the flow channels. However, a blow-off process with air or a flushing process with pure water may also be provided. In that case as well, the air or water velocity in the region of the gaps 11 still does not attain values which would cause the powdered brazing material that was deposited there to be removed. The carrier body, which is thus cleaned of excess mixture, is then dried, which may already have been performed by air drying in the blow-off operation, under some circumstances. After the drying, the brazing material particles are glued together by the dried binder and held together as a result.

During ensuing heating in a brazing furnace, desired brazing takes place solely at the later connecting points 12. The other boundary surfaces of the flow channels 10 remain unaffected.

It is therefore possible, through the use of the novel method according to the invention, to successfully maintain locations of the thin sheets 1 and 2 that will not later be connected together, in such a condition as to be free of brazing material, while the powdered brazing material itself is deposited in an optimal quantity at the points where it is needed.

We claim:

1. A method for brazing catalytic converter carrier bodies having a jacket and adjacent layers of metal foils in the jacket, the metal foils contacting each other and contacting the jacket at connecting points, defining flow channels between the metal foils and between the metal foils and the jacket and defining brazing gaps at the connecting points, which comprises:

initially dispersing powdered brazing material with a suitable particle size in a mixture of binder material and liquid;

flooding the flow channels with the liquid mixture for depositing the brazing material in at least some of the brazing gaps;

subsequently removing excess mixture from the flow channels; and then brazing in the brazing gaps.

2. The method according to claim 1, which comprises placing corrugated metal foils in the jacket.

3. The method according to claim 1, which comprises placing smooth and corrugated metal foils in the jacket.

4. The method according to claim 1, which comprises winding the metal foils in the jacket.

5. The method according to claim 1, which comprises layering the metal foils in the jacket.

6. The method according to claim 1, which comprises inserting the metal foils and the jacket into a flow line carrying the mixture for performing the flooding step.

7. The method according to claim 1, which comprises drying the metal foils and the jacket after the excess mixture is removed from the flow channels.

8. The method according to claim 1, which comprises making a flow profile of the mixture uniform prior to the flooding step.

9. The method according to claim 1, which comprises excluding given regions of the metal foils from flooding.

10. A method for producing and brazing catalytic converter carrier bodies, which comprises:

placing adjacent layers of metal foils in a jacket with the metal foils contacting each other and contacting the jacket at connecting points, defining flow channels between the metal foils and between the metal foils and the jacket and defining brazing gaps at the connecting points;

dispersing powdered brazing material with a suitable particle size in a mixture of binder material and liquid;

flooding the flow channels with the liquid mixture for depositing the brazing material in at least some of the brazing gaps;

subsequently removing excess mixture from the flow channels; and then brazing in the brazing gaps.

11. The method according to claim 10, which comprises placing corrugated metal foils in the jacket.

12. The method according to claim 10, which comprises placing smooth and corrugated metal foils in the jacket.

13. The method according to claim 10, which comprises winding the metal foils in the jacket.

14. The method according to claim 10, which comprises layering the metal foils in the jacket.

15. The method according to claim 10, which comprises inserting the metal foils and the jacket into a flow line carrying the mixture for performing the flooding step.

16. The method according to claim 10, which comprises drying the metal foils and the jacket after the excess mixture is removed from the flow channels.

17. The method according to claim 10, which comprises making a flow profile of the mixture uniform prior to the flooding step.

18. The method according to claim 10, which comprises excluding given regions of the metal foils from flooding.

* * * * *